United States Patent [19]

Kitamura et al.

[11] Patent Number: 4,492,885
[45] Date of Patent: Jan. 8, 1985

[54] ALTERNATING CURRENT GENERATOR FOR A CAR

[75] Inventors: Yutaka Kitamura, Himeji; Yoshihisa Kitora; Masatoshi Koyanagi, both of Amagasaki, all of Japan

[73] Assignee: Mitsubishi Denki Kabushiki Kaisha, Tokyo, Japan

[21] Appl. No.: 358,587

[22] Filed: Mar. 16, 1982

[30] Foreign Application Priority Data

Mar. 30, 1981 [JP] Japan .................. 56-47199[U]

[51] Int. Cl.³ .................................... H02K 9/06
[52] U.S. Cl. ........................ 310/62; 310/63; 310/64; 310/68 D; 310/89
[58] Field of Search ............. 310/58, 59, 62, 63, 310/64, 65, 68 D, 89, 263, 88, 52

[56] References Cited

U.S. PATENT DOCUMENTS

| | | | |
|---|---|---|---|
| 3,527,970 | 9/1970 | Wightman | 310/63 |
| 3,666,978 | 5/1972 | Renner | 310/65 |
| 3,725,706 | 4/1973 | Lukens | 310/62 |
| 3,749,953 | 7/1973 | Baumann | 310/62 |
| 4,169,282 | 9/1979 | Allport | 310/680 |
| 4,360,749 | 11/1982 | Neumann | 310/89 |

FOREIGN PATENT DOCUMENTS

| | | | |
|---|---|---|---|
| 0284268 | 9/1970 | Austria | 310/680 |
| 1872769 | 2/1963 | Fed. Rep. of Germany | 310/62 |
| 3038031 | 4/1981 | Fed. Rep. of Germany | 310/58 |
| 1502017 | 9/1967 | France . | |
| 1113428 | 5/1968 | United Kingdom | 310/58 |
| 1149856 | 4/1969 | United Kingdom | 310/263 |

Primary Examiner—R. Skudy
Attorney, Agent, or Firm—Oblon, Fisher, Spivak, McClelland & Maier

[57] ABSTRACT

An alternating current generator for a car comprises the first centrifugal fan which is fixed to one end of the rotor and has a diameter smaller than that of the rotor, the first ventilating hole for feeding a coolant air which is formed in the end portion in the axial direction of the bracket in the side of the centrifugal fan, the second ventilating hole for discharging the coolant air which is formed in the cylindrical portion of the bracket in which the first ventilating hole is formed, the second centrifugal fan which is fixed to the other end of the rotor and has a diameter larger than that of the rotor, the third ventilating hole for feeding a coolant air which is formed in the end in the axial direction of the other bracket and the fourth ventilating hole for discharging a coolant air which is formed in the cylindrical portion of the other bracket.

8 Claims, 4 Drawing Figures

ALTERNATING CURRENT GENERATOR FOR A CAR

BACKGROUND OF THE INVENTION

1. Field of the Invention

The present invention relates to an alternating current generator. More particularly, it relates to an improvement of the cooling means of an alternating current generator which can effectively cool a rectifying device and a stator coil emitting a large heat energy.

2. Description of the Prior Art

The conventional alternating current generator will be described with reference to FIG. 1.

In FIG. 1, the reference numeral (1) designates a cooling fan driven by an engine (not shown); (2) designates a front bracket which is placed adjacent the cooling fan and has a cup-like shape having a cylindrical portion (2a); (21) designates a ventilating hole as the third ventilating hole which is formed in the end portion in the axial direction of the front bracket; (300) designates a cup-like rear bracket which is placed to face the front bracket in the axial direction and has a cylindrical portion (300a) and a dust-proof cylindrical portion (300b); (301) designates a ventilating hole as the first ventilating hole which is formed in the end portion in the axial direction of the rear bracket; (4) designates a stator held by the front and rear brackets (2), (300); (4a) designates a stator core which forms the stator; (5) designates a rotor placed inside of the stator and is rotatably held by the brackets (2), (300); (6) designates a rectifying device fixed to the rear bracket (300); (6a) designates a heat-radiating plate as a part of the rectifying device (6); (7) designates a stator coil which is wound in the stator and is impregnated with an insulating substrate such as varnish to be cured and (8) designates a collecting device for feeding current to the rotor (5).

In the structure as shown in FIG. 1, a coolant air enters from the outside of the rear bracket (300) by the revolution of the cooling fan (1) in the direction of the arrow mark (a) to cool the rectifying device (6), the stator coil (7), the stator core (4a) and the rotor (5).

The condition of passing the coolant air through the surface of the stator coil (7) and the stator core (4a) will be described with reference to FIG. 1.

In the stator coil (7) projecting toward the rear bracket (300) from the level of the stator core (4a), the reference numeral (7a) designates the surface of the stator coil (7) which faces the inner surface of the rear bracket (300) and (7b) designates the surface of the stator coil (7) which faces the rotor (5). Similarly, in the stator coil (7) projecting toward the front bracket (2), the reference numeral (7c) designates the surface of the stator coil (7) which faces the inner surface of the front bracket (2) and (7d) designates the surface of the stator coil (7) which faces the rotor (5). The reference numerals (71), (72) respectively designate air gaps formed between the stator coil (7) and the stator core (4a) when the stator coil is formed in the stator core (4a).

In the conventional generator having the structure shown in FIG. 1, the coolant air is introduced by revolution of the cooling fan (1) through the ventilating hole (301) of the rear bracket (300) and is passed through the rear bracket (300) in the direction of the arrow mark (a) to cool the surface (7b) of the stator coil (7) which faces the rotor (5) in the rear bracket side, the rotor (5), the stator core (4) and the surface of the stator coil (7) which faces the rotor in the front bracket side. However, on the surfaces (7a), (7c) of the stator coil (7) which face the inner surfaces of the front and rear brackets (2), (300) and in the air gaps (71) and (72), flowing of the cooling air is extremely small and a hot air stays in the portions to cause inferior heat radiation whereby the cooling of the stator coil is prevented. Thus, high temperature rising causes the problem on dynamo characteristic.

SUMMARY OF THE INVENTION

It is an object of the present invention to overcome the disadvantage of the conventional generator and to provide an alternating current generator for a car which gives a effective and sufficient cooling effect to a stator emitting a large heat energy as well as a rectifying device by passing a coolant air through the surfaces of a stator coil, a stator core and the heat-radiating plate of the rectifying device at a sufficiently large peripheral velocity.

The foregoing and the other objects of the present invention have been attained by providing an alternating current generator for a car comprising front and rear brackets which respectively have a cup-like shape having a cylindrical portion and face in the axial direction each other, a rectifying device fixed to either of the brackets, a stator held between the brackets, and a rotor which is placed inside of the stator and is rotatably held by the brackets, which comprises the first centrifugal fan which is fixed to one end of the rotor and has a diameter smaller than that of the rotor, the first ventilating hole for feeding a coolant air which is formed in the end portion in the axial direction of the bracket in the side of the centrifugal fan, the second ventilating hole for discharging the coolant air which is formed in the cylindrical portion of the bracket in which the first ventilating hole is formed, the second centrifugal fan which is fixed to the other end of the rotor and has a diameter larger than that of the rotor, the third ventilating hole for feeding the coolant air which is formed in the end in the axial direction of the other bracket and the fourth ventilating hole for discharging the coolant air which is formed in the cylindrical portion of the other bracket wherein the coolant air is sucked through the third ventilating hole and is discharged from the fourth ventilating hole by the revolution of each centrifugal fan, a part of the coolant air sucked from the third ventilating hole is discharged through the gap between the rotor and the stator and the coolant air sucked through the first ventilating hole is discharged from the second ventilating hole.

DETAILED DESCRIPTION OF THE PREFERRED EMBODIMENT

An embodiment of the present invention will be described with reference to FIGS. 2, 3 and 4.

Figure 1:
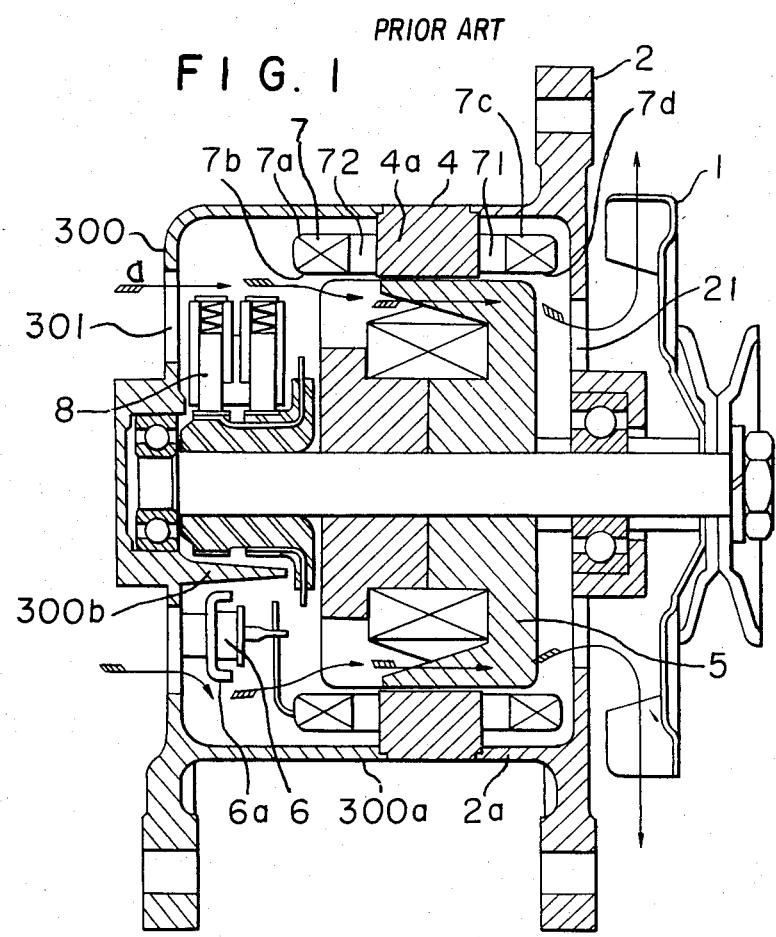
FIG. 1 is a sectional view of the conventional alternating current generator for a car.
Figure 2:
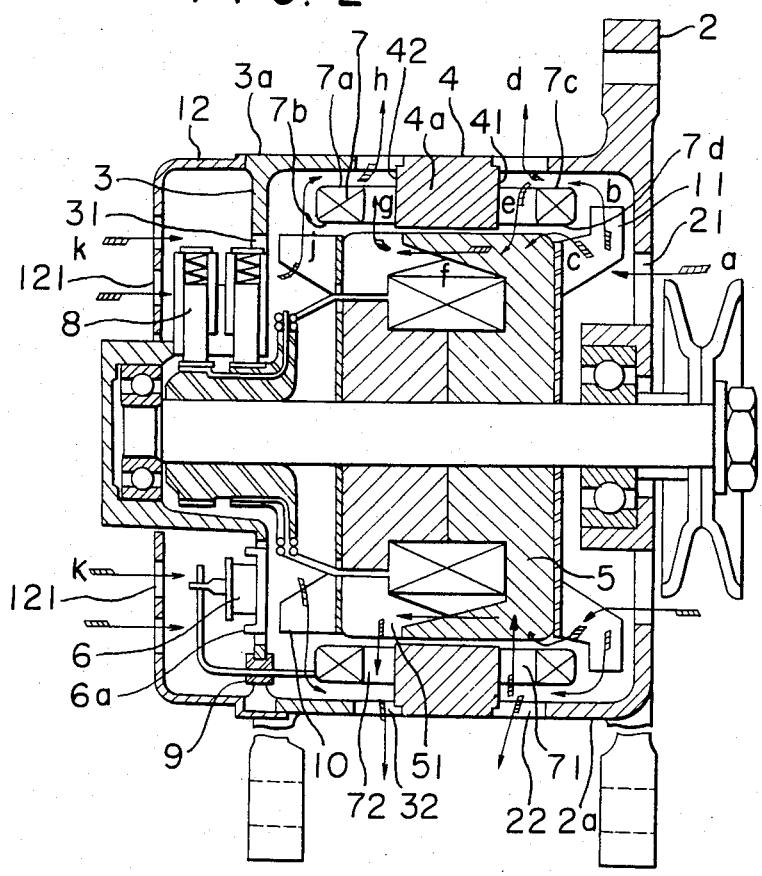
FIG. 2 is a sectional view of an embodiment of the alternating current generator of the present invention.
Figure 3:
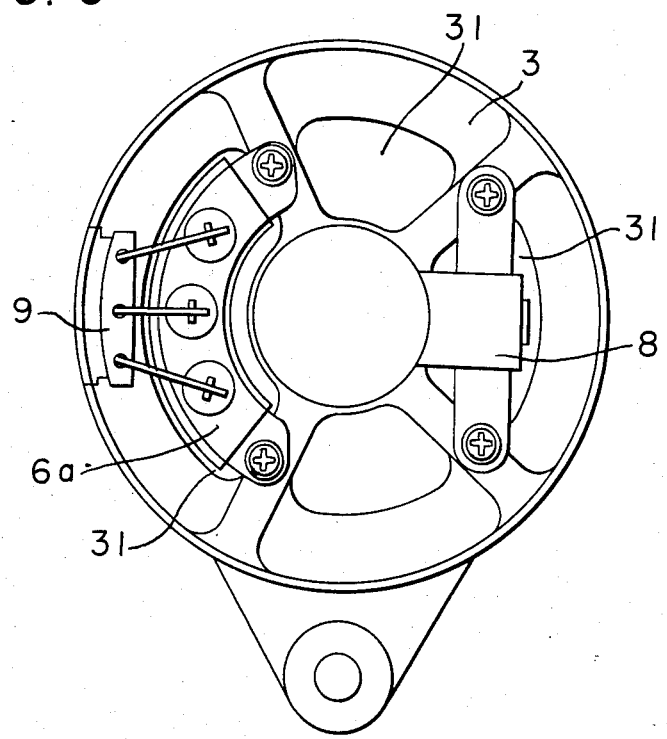
FIG. 3 is a sectional view taken along line I—I in FIG. 2.
Figure 4:
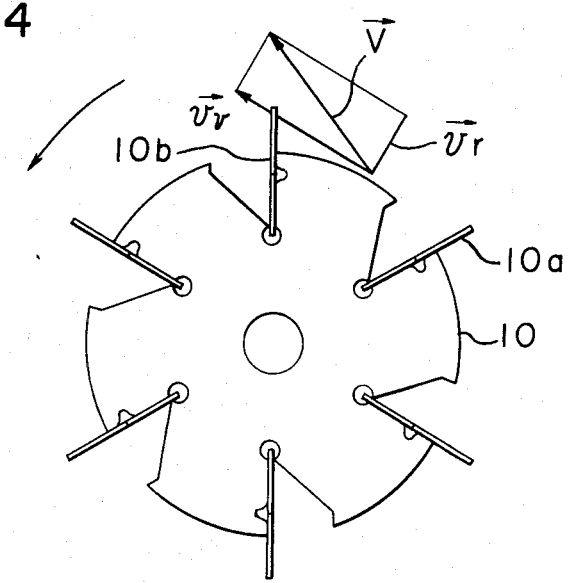
FIG. 4 is a schematic view showing effect of the coolant air attained by a centrifugal fan placed in the side of a rotor in an embodiment of the present invention.

In the FIGS. 2, 3 and 4, the reference numeral (22) designates a plurality of ventilating holes as the fourth ventilating holes which are formed in the circular surface of the cylindrical portion (2a) of the front bracket (2); (3) designates a bracket having a shape formed by connecting, in one piece, the cylindrical portion (300a) and the dust-proof cylindrical portion (300b) shown in FIG. 1; (31) designates a ventilating hole as the first ventilating hole which is formed in the end portion in the axial direction of the bracket (3); and (32) designates a ventilating hole as the second ventilating hole which is formed in the cylindrical portion (3a) of the bracket (3). (10) designates a small centrifugal fan for cooling which is fixed to the end surface of the rotor (5) in one piece so as to close the ventilating hole (51) of the rotor (5); (11) designates a large centrifugal fan which is fixed in one piece, to the end surface of the rotor (5) in the side opposite the small centrifugal fan so as to be adjacent the end surface of the front bracket (2) and to close the ventilating hole (51) of the rotor (5) and which has an outer diameter larger than that of the small centrifugal fan (10). The larger centrifugal fan is formed with an outward projection on the end of the fan blade that is parallel to the front bracket. (12) designates a protecting cover for protecting the collecting device (8) and the rectifying device (6) from mud water, salt water, dust which causes fault of the devices; (121) designates a ventilating hole as the fifth ventilating hole formed in the end surface in the axial direction of the protecting cover; (6a) designates a heat radiating plate placed adjacent the first ventilating hole (31) of the bracket (3) so as to form a part of the end surface in the axial direction of the bracket (3); and (9) designates a bushing for insulating and fixing a wire connecting the stator coil to the rectifying device.

In the embodiment, the rotor (5) is rotated by an engine (not shown) whereby cooling air is sucked from the outside by functions of the small centrifugal fan (10) and the large centrifugal fan (11) which are respectively fixed to each end surface of the rotor (5).

When the large centrifugal fan (11) is rotated, a coolant air is sucked through the third ventilating hole (21) as shown in the arrow mark (a) and the coolant air is passed in the direction of the arrow mark (b) along the blades of the large centrifugal fan because the ventilating hole (51) in the end surface of the rotor is closed by the end surface of the centrifugal fan (11). A part of coolant air emitted from third ventialting hole 21 as shown in the arrow mark (c) passes through the rotor. The pressure above the surface (7c) of the stator coil (7) facing the inner surface (11) of the front bracket (2) becomes positive pressure whereby a part of the coolant air is discharged through the fourth ventilating hole to the outside as shown by the arrow mark (d). Similarly, a coolant air is sucked through the fifth ventilating hole formed in the protecting cover (12) as shown by the arrow mark (k) by the revolution of the small centrifugal fan (10) and a part of the coolant air directly strikes the rectifying device (6) to cool it before passing the first ventilating hole (31) as shown by the arrow mark (J). In comparison of the pressure above the surface (7c) of the stator coil (7) facing the inner surface of the front bracket (2) with the pressure above the surface (7a) of the stator coil (7) facing the inner surface of the bracket (3), positive pressure produced above the surface (7c) of the stator coil (7) is greater than positive pressure produced above the surface (7a) of the stator coil by the small centrifugal fan (10) because the outer diameter of the large centrifugal fan (11) is larger than that of the small centrifugal fan (10). Accordingly, a pressure gradient is produced through the ventilating hole (51) of the rotor (5) between the surface (7a) and (7c) of the stator coil (7) whereby a part of the cooling air passing along the arrow mark (b) is passed through the ventilating hole (51) of the rotor (5) as shown by the arrow marks (e), (f) and (g) and is combined to the coolant air (J) to be discharged through the second ventilating hole (32) to the outside as shown by the arrow mark.

When the coolant air (shown by the arrow mark (b)) is passed between the blade (11a) and the blade (11b) of the large centrifugal fan (11) as shown in FIG. 4, the velocity vector of the coolant air is given as $\vec{V}r$ in view of the revolution system co-ordinates fixed to the fan. When the coolant air is discharged from the large centrifugal fan (11), the relative velocity $\vec{V}v$ of the inertia system co-ordinates given by fixing the revolution system co-ordinates fixed to the fan, is added because of revolution of the large centrifugal fan (11). That is, the vector of the coolant air is $\vec{V}$ given by composing the vectors $\vec{V}r$ and $\vec{V}v$. Thus, a coolant air having components accelerated to the stator coil and turned along the surface (7c) of the stator coil (7) whereby heat energy carried from the surface (7c) of the stator coil (7) is as several times. Thus, the stator coil (7) can be effectively cooled.

Peripheral velocity is also given to the coolant air shown by the arrow mark J by the small centrifugal fan (10) whereby the surface (7a) of the stator coil (7) is also effectively cooled. Furthermore, the heat-radiating plate (6a) of the rectifying device (6) is placed adjacent the first ventilating hole (31) to form a part of the end surface in the axial direction of the bracket (3) whereby the coolant air (J) has a peripheral velocity to the heat-radiating plate (6a), thus the rectifying device is effectively cooled through the heat-radiating plate (6a). The inner surfaces of the front bracket (2) and the bracket (3) and the side surfaces (41), (42) of the stator core (4a) are also effectively cooled because of the coolant air having a peripheral velocity whereby heat energy escaping from the stator coil (7) to the stator core (4a), the front bracket (2) and the bracket (3) can be increased to further promote the cooling effect of the stator coil (7).

As described above, the entire surface of the stator coil (7) and side surfaces (41), (42) of the stator core (4a) are effectively cooled by the coolant air. Furthermore, the stator coil and the stator core are cooled by providing difference between the fan characteristics of the centrifugal fans fixed to the end surfaces of the rotor and passing a sufficient amount of a coolant air through the air gaps between the rotor and the stator having large heat-radiating areas and efficiencies whereby temperature rise of the stator coil (7) can be remarkably prevented. Temperature rise in the rectifying device can be prevented by a coolant air directly fed through the fifth ventilating hole (121) and by indirect cooling through the heat-radiating plate (6a) by the effect of peripheral velocity of the coolant air caused by the small centrifugal fan.

Briefly, an alternating current generator of the present invention comprises the first centrifugal fan fixed to one end of a rotor, the first ventilating hole for feeding a coolant air which is formed in the end portion in the axial direction of one bracket in the side of the first centrifugal fan, the second ventilating hole for discharging the coolant air which is formed in the cylindrical portion of the bracket in which the first ventilating hole is formed, the second centrifugal fan fixed to the other end of the rotor and having an outer diameter larger than that of the first centrifugal fan, the third ventilating hole for feeding a coolant air which is formed in the end portion in the axial direction of the other bracket, and the fourth ventilating hole for discharging a coolant air which is formed in the cylindrical portion of the other bracket. When both the centrifugal fans are rotated, a coolant air is sucked through the third ventilating hole to be discharged from the fourth ventilating hole and a part of the coolant air sucked through the third ventilating hole is discharged through the air gap between the rotor and the stator from the second ventilating hole. Cooling air sucked through the first ventilating hole is also discharged from the second ventilating hole whereby temperature rise of the stator coil is prevented and the rectifying device is also effectively cooled.

We claim:

1. An alternating current generator for a car comprising:
   first and second brackets which respectively have a cup-like shape having a cylindrical portion and facing each other in the axial direction,
   a rectifying device fixed to one of said brackets,
   a stator held between said brackets,
   a rotor which is placed inside of said stator and is rotatably held by both of said brackets,
   a first centrifugal fan fixed to one end of said rotor,
   first ventilating means formed in the cupped end portion of one of said first and second brackets in the axial direction and on the side of said alternator having said first centrifugal fan, for feeding coolant air,
   a second ventilating means formed in the cylindrical portion of said first bracket in which the first ventilating means is formed for discharging the coolant air,
   a second centrifugal fan which is fixed to the other end of said rotor and which has an outer diameter larger than that of said first centrifugal fan and wherein said second centrifugal fan has a outer diameter greater than the inner diameter of said stator,
   third ventilating means for feeding coolant air which is formed in the end portion in the axial direction of said second bracket, and
   fourth ventilating means for discharging coolant air which is formed in the cylindrical portion of said second bracket, wherein when said first and second centrifugal fans are rotated, coolant air is ventilated through said third ventilating means to be discharged from said fourth ventilating means, a part of the coolant air ventilated through said third ventilating means is discharged from said second ventilating means through the air gap between the rotor and the stator and a coolant air ventilated through said first ventilating means is discharged from said second ventilating means.

2. An alternating current generator according to claim 1 wherein the outer diameter of said first centrifugal fan is smaller than that of said rotor and the outer diameter of said second centrifugal fan is larger than that of said rotor.

3. An alternating current generator according to claim 1 wherein a plurality of said fourth ventilating holes are formed in the circular surface of the cylindrical portion of said second bracket.

4. An alternating current generator according to claim 1 wherein said second ventilating holes are formed in the cylindrical portion of said first bracket in positions opposite said fourth ventilating holes in connection with said stator.

5. An alternating current generator according to claim 1 wherein said first centrifugal fan is attached in one piece with the end surface of said rotor so as to close a ventilating hole of said rotor.

6. An alternating current generator according to claim 1 further comprising a protecting cover formed on said first bracket and facing said first ventilating hole and having a fifth ventilating means 7. An alternating current generator according to claim 1 wherein said rectifying device is fixed to said first bracket having the first ventilating means and a heat-radiating plate is placed adjacent said first ventilating means to radiate heat of said rectifying device.

8. An alternating current generator for a car comprising:
   first and second brackets which respectively have a cup-like shape having a cylindrical portion and are facing each other in the axial direction,
   a rectifying device fixed to one of said brackets,
   a stator held between said brackets,
   a rotor which is placed inside of said stator and is rotatably held by both said brackets,
   a first centrifugal fan fixed to one end of said rotor,
   first ventilating means formed in the cupped end portion in the axial direction of one of said first and second brackets, on the side of said alternator having said first centrifugal fan, for feeding coolant air,
   second ventilating means formed in the cylindrical portion of said first bracket in which the first ventilating means is formed, for discharging coolant air,
   a second centrifugal fan having outward radially directed extensions having an outer diameter larger than that of said first centrifugal fan and greater than the inner diameter of said stator by virtue of said outward extension being in a direction parallel to said first bracket thereby increasing the linear edge velocity of said second centrifugal fan, said second centrifugal fan fixed to the other end of said rotor,
   third ventilating means formed in the end portion and in the axial direction of said second bracket, for feeding coolant air; and
   a fourth ventilating means formed in the cylindrical portion of said second bracket for discharging coolant air, wherein when said first and second centrifugal fans are rotated, coolant air passes through said third ventilating means, a part of the coolant air ventilated through said third ventilating means is discharged from said second ventilating means through the air gap between the rotor and the stator, coolant air ventilated through said first ventilating means is discharged from said second ventilating means.

* * * * *